United States Patent
van Zandwijk

(10) Patent No.: US 7,360,968 B2
(45) Date of Patent: Apr. 22, 2008

(54) METHOD AND DEVICE FOR ANCHORING A PIPELINE

(75) Inventor: Cornelis van Zandwijk, Waddinxveen (NL)

(73) Assignee: Heerema Marine Contractors Nederland B.V., Leiden (NL)

( * ) Notice: Subject to any disclaimer, the term of this patent is extended or adjusted under 35 U.S.C. 154(b) by 0 days.

(21) Appl. No.: 11/045,492

(22) Filed: Jan. 31, 2005

(65) Prior Publication Data
US 2005/0180820 A1 Aug. 18, 2005

Related U.S. Application Data

(60) Provisional application No. 60/540,065, filed on Jan. 30, 2004.

(51) Int. Cl.
*F16L 1/16* (2006.01)
*F16L 1/23* (2006.01)
(52) U.S. Cl. .................. 405/172; 405/224; 166/341
(58) Field of Classification Search .......... 405/168.4, 405/169, 172, 224; 166/341
See application file for complete search history.

(56) References Cited

U.S. PATENT DOCUMENTS

| | | | | | |
|---|---|---|---|---|---|
| 4,558,972 | A | * | 12/1985 | Langner | 405/169 |
| 4,615,646 | A | * | 10/1986 | Langner | 405/169 |
| 4,842,075 | A | * | 6/1989 | Kalvenes et al. | 166/341 |
| 7,025,535 | B2 | * | 4/2006 | Chiesa et al. | 405/169 |
| 2004/0218981 | A1 | * | 11/2004 | Chenin | 405/169 |
| 2005/0271476 | A1 | * | 12/2005 | Chiesa et al. | 405/172 |

FOREIGN PATENT DOCUMENTS

WO WO 03/012327 A1 8/2002

* cited by examiner

*Primary Examiner*—Tara L. Mayo
(74) *Attorney, Agent, or Firm*—Browdy and Neimark, PLLC

(57) ABSTRACT

An anchoring method and device, for anchoring a pipeline to a seabed. The pipeline may extend from a well which is located on a seabed to a floating platform. Tension forces which are exerted on the pipeline by the platform are diverted into the seabed by the anchoring device.

32 Claims, 11 Drawing Sheets

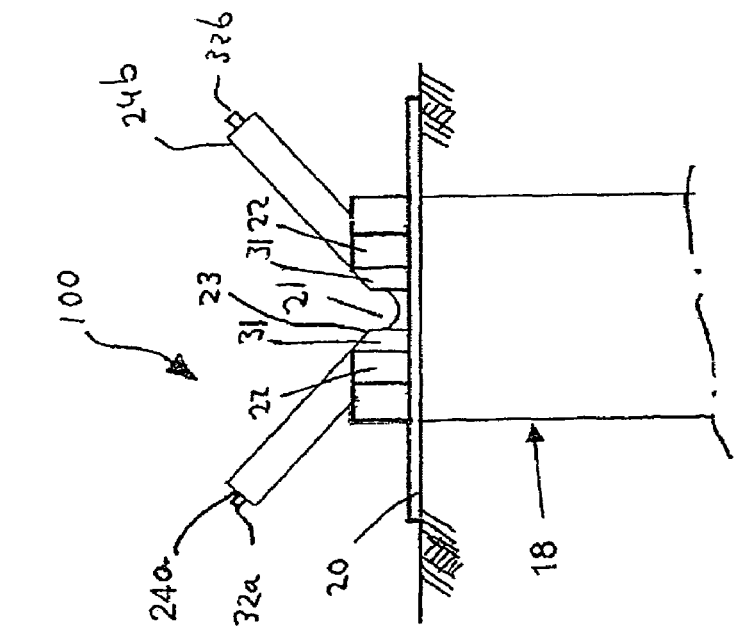
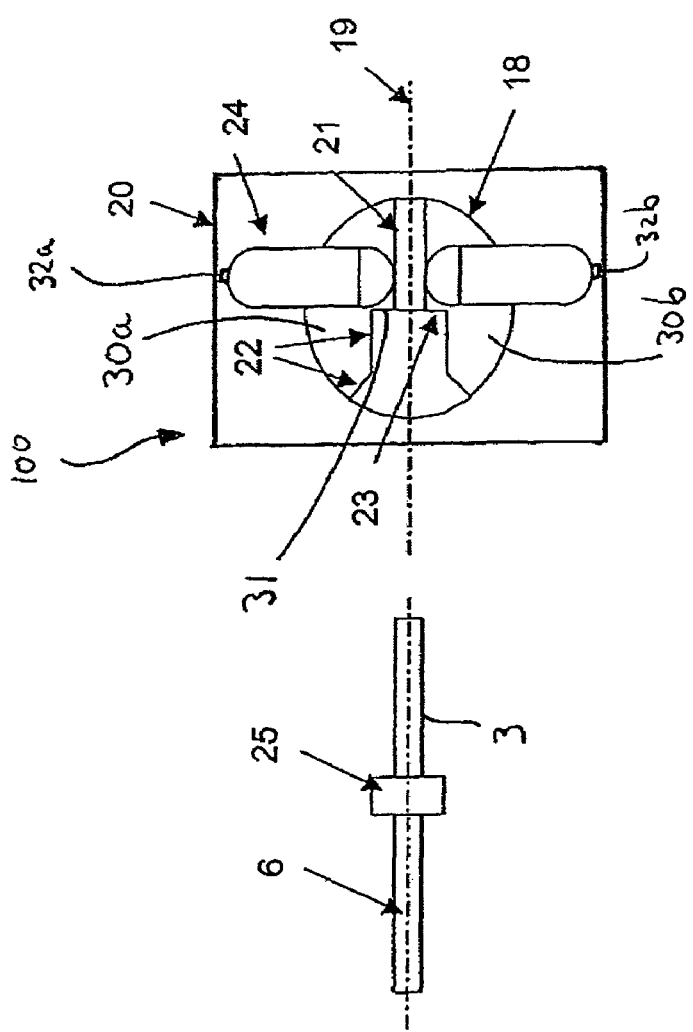
Fig. 8b
Fig. 8a

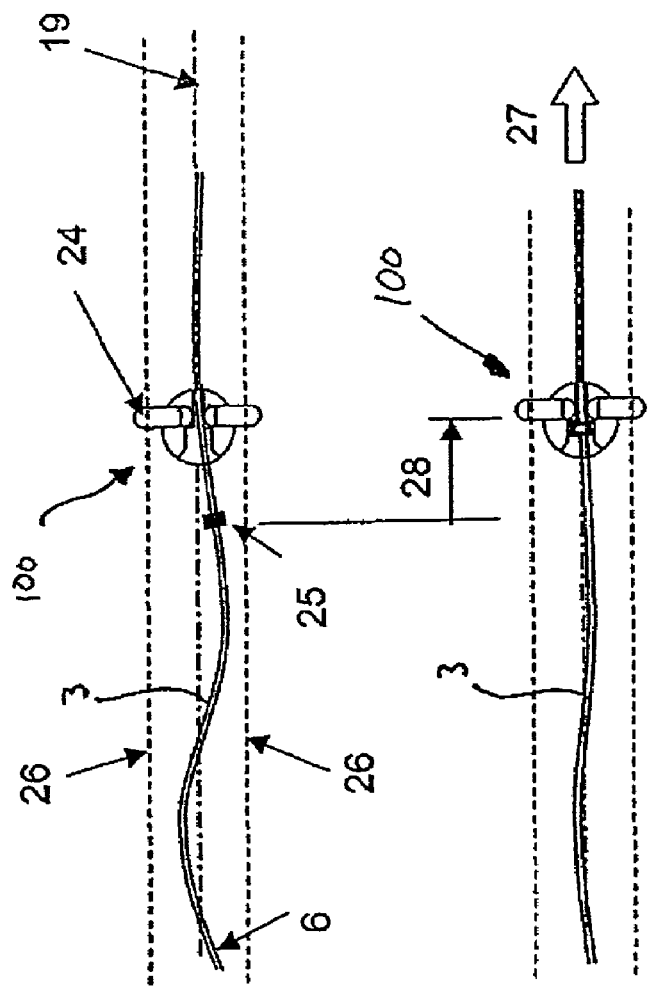

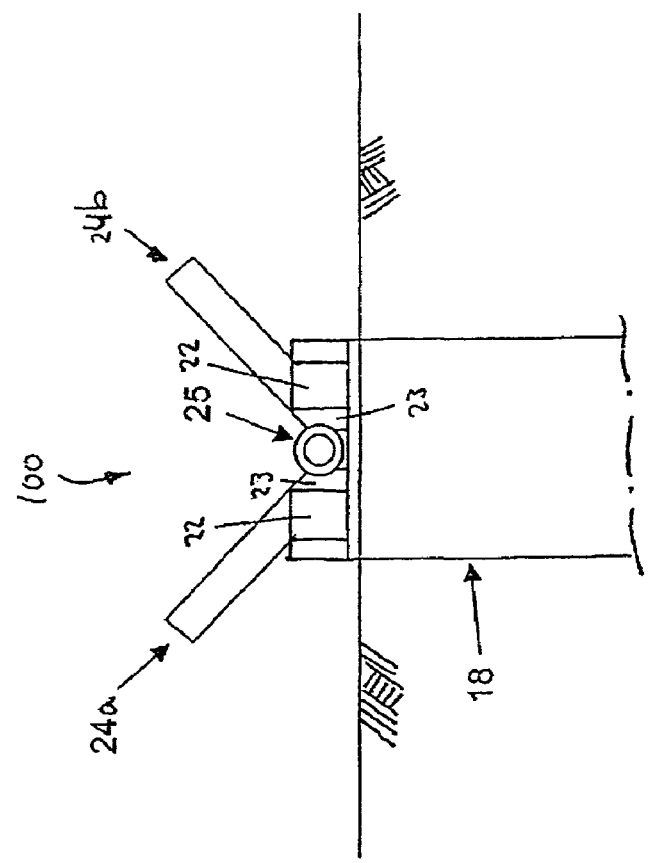
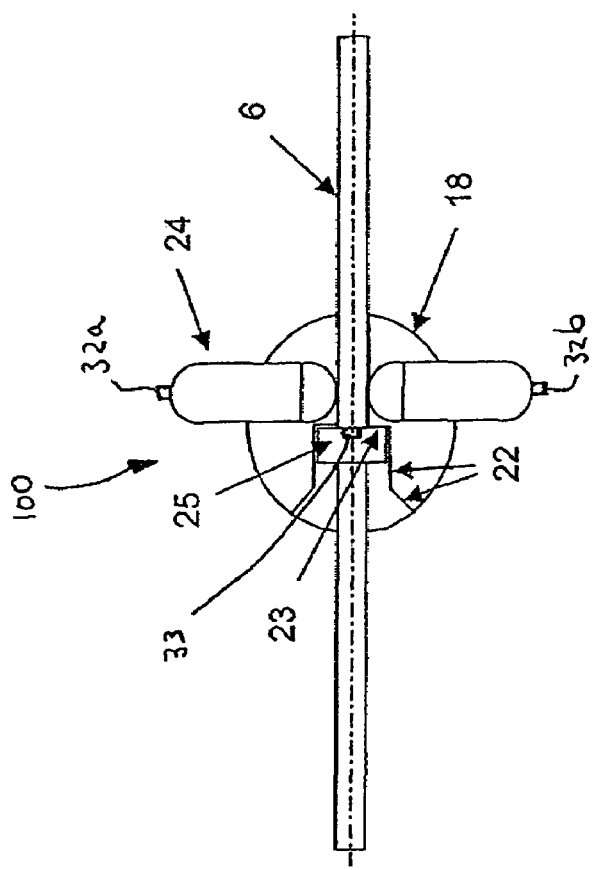
Fig. 10a
Fig. 10b

METHOD AND DEVICE FOR ANCHORING A PIPELINE

FIELD OF THE INVENTION

The present invention relates to an apparatus and method for anchoring a pipeline.

Pipelines are widely applied in the off-shore industry where in deep water, pipe sections are joined together to form a pipeline which is lowered to an underwater seabed.

Pipelines are often laid from a well in an oil and/or gas field to a production facility which is remotely located from the well. The pipeline is connected on one end to the well, which is located at the level of the seabed. From the well, the pipeline extends over the seabed for a predetermined distance towards the production facility. The production facility is generally located at or above the water level. Generally, the production facility is a floating construction, and therefore the pipeline must, at a certain location, rise from the seabed and extend upwardly towards the production facility.

Often, different wells are connected to one production facility by respective pipelines. Due to current of the water, wind and waves, forces are exerted upon the production facility and the pipeline. The production facility and the pipeline will move as a result of these forces. The production facility may pull the pipeline and create tensile forces in the pipeline. When the well is located near the production facility, the distance along which the pipeline extends over the seabed is short. In that case, horizontal forces may be exerted upon the well by the pipeline when the production facility pulls the pipeline. This may cause damage to the connection between the pipeline and the well, or the well itself, or deteriorate the quality of the connection in terms of lifetime, strength, etc.

Therefore, in the field of the art, anchoring methods and devices have been developed to anchor a pipeline to the seabed, at a location between the well and the production facility. Usually, the anchoring is performed during the laying of the pipeline.

DESCRIPTION OF THE PRIOR ART

In the prior art, a method and device is known for anchoring a pipeline to a seabed. In the known method and device, the pipeline is anchored to the seabed during the laying of the pipe. The pipe extends from a pipe-laying vessel down to the seabed and contacts the seabed at a touch-down point. From the touch-down point to the well, the pipeline extends over the seabed. Between the touch-down point and the pipe-laying vessel, the pipeline follows the trajectory of a catenary line.

When, during the laying of the pipeline, the pipeline reaches the envisaged touch-down point, the pipeline can be anchored at the desired anchoring point which is located at a predetermined distance from the touch-down point. At this anchoring point, anchor piles are driven into the seabed. A coupling organ is connected to the pipeline and is lowered together with the pipeline towards the anchor piles. Connection means are connected with a first end to the coupling organ and with a second end to a respective anchor pile. The connection means extends in a direction towards the vessel, in order to ensure that only an axial tensile force is exerted on the pipeline. Often, this anchoring system is required already during installation of the pipeline.

A disadvantage of the known method is that the connection means between the piles and the coupling organ on the pipeline can only be connected after the coupling organ, which is connected to the pipeline, has been lowered to the seabed. Due to the catenary shape of the pipeline from the touch-down point to the pipe-laying vessel, the pipe-laying vessel is at a distance of approximately one-third of the water depth ahead of the touch-down point. This implies that the connection means cannot be connected from the pipe-laying vessel and that a separate construction barge or surface vessel is required for connecting a connection means to the coupling organ on the pipeline.

SUMMARY OF THE INVENTION

It is an object of the present invention to provide a method and device for anchoring a pipeline in which the pipeline can be anchored to the seabed by the pipe-laying vessel, obviating the need for a second vessel.

It is another object of the present invention to provide a method and device for anchoring a pipeline to a seabed in a cost-effective and technically reliable way.

At least one of the above objects is reached in a method for anchoring a submerged pipeline in particular to a seabed, comprising the steps of:

(a) providing the pipeline with a stop organ connected thereto;
(b) connecting an anchoring device to the seabed;
(c) laying the pipeline on the seabed from a floating vessel; and
(d) guiding the pipeline into a position wherein the stop organ engages the anchoring device.

The present method provides a cost-effective and technically reliable way of anchoring a pipeline to a seabed, without the need for a second vessel. The method may also be applied on a lake or generally in sweet water. The floating vessel may also be a construction barge or platform. Generally, the free end of the pipeline will be above the water line.

The anchoring device may be attached to the seabed when the pipe-laying vessel is directly above the location at which the anchoring device is to be positioned. After the anchoring device is attached to the seabed, the vessel will proceed with laying the pipeline. The pipeline will then reach the anchoring device on the seabed. The pipeline is then lowered on the anchoring device and guided into a position in which the stop organ engages the anchoring device. In this position, the pipeline is held by the anchoring device in an axial direction of the pipeline, and the anchoring device can bear tensile forces which are exerted on the pipeline in the direction of the main axis thereof.

It is possible that the laying of the pipeline and the guiding of the pipeline into a position wherein the stop organ engages the anchoring device is performed simultaneously. This may result in a fluent movement of the pipeline and the stop organ.

Preferably, the stop organ comprises a collar. A collar with substantially the same form around the circumference of the pipeline allows rotation of the pipeline around its main longitudinal axis before engagement with the anchoring device.

Preferably, during step (c) the stop organ is positioned on the seabed at a predetermined distance from the anchoring device, and during step (d) the pipeline is moved in order to engage the stop organ with the anchoring device.

It is relatively easy to let the stop organ reach the seabed at a predetermined distance from the anchoring device. In this way the desired accuracy of the positioning of the stop organ relative to the anchoring device can be less, making the positioning easier to perform. When the stop organ has touched the seabed, a horizontal positioning in the axial direction of the pipeline will be performed, in order to let the stop organ engage the anchoring device. The pipeline may be moved into the direction of the anchoring device by the pipe-laying vessel, which pulls at the free end of the pipeline, causing the stop organ to move towards the anchoring device. The stop organ may be guided by a guiding organ to facilitate a simple engagement of the stop organ and the anchoring device.

Preferably, the pipeline is guided at least partly by the anchoring device. When the pipeline is lowered towards the anchoring device, the anchoring device guides the pipeline in the correct position. In this way, the positioning is facilitated, reducing the need for a very accurate positioning of the pipeline by the pipe-laying vessel.

Preferably, during step (d) the pipeline is moved substantially horizontally in order to engage the stop organ with the anchoring device. This movement may be performed by the pipe-laying vessel, which pulls at the free end of the pipeline, thereby moving the pipeline horizontally. The stop organ will move with the pipeline. In this way it can be ensured that the stop organ is positioned correctly relative to the anchoring device. Generally, this will be a horizontal movement.

Preferably, the pipeline is connected with a first end thereof to the vessel, and with a second end thereof to a well. The anchoring method can thus be used to prevent the pipeline from exerting forces on the well. The section of pipeline between the well and the anchoring device may be substantially free of tensile forces, in the longitudinal direction of the pipeline. Other types of endpoints of the pipeline on the seabed, such as for instance a manifold, are also possible.

Preferably, the pipeline is laid in a curved trajectory over a predetermined distance on a side of the anchoring device where the stop organ engages the anchoring device. Generally, this will be section of the pipeline between the well and the anchoring device.

In this way, an extra length of pipeline is available when the pipeline is pulled by the pipe-laying vessel in order to move the stop organ towards the anchoring device and let the stop organ engage with the anchoring device.

Preferably, the curved trajectory is substantially sinusoidal. If the pipe-laying vessel lays the pipeline in a curved trajectory, a substantially sinusoidal trajectory is an easy route for the pipe-laying vessel to follow.

Preferably, during completion, the end of the pipeline is connected to a floating production facility. When the pipeline is anchored to the seabed, the pipeline in general will almost have reached its endpoint. At the endpoint, the pipe-laying vessel will transfer the end of the pipeline to the production facility, thereby completing its installation. In its final stage the pipeline will be suspended from the production facility. A person skilled in the art will appreciate that any other floating construction to which a pipeline needs to be connected may also be applied.

Generally, the pipeline contacts the seabed at a touch-down point, wherein the pipeline is maintained along a catenary curve which extends from the touch-down point to the vessel. With the catenary curve, it is achieved that only tensile forces in the axial direction of the pipeline will exist.

Preferably, the buoyancy of the pipeline is increased by buoyancy means. Applying buoyancy means will decrease the force that the pipeline exerts on the pipe-laying vessel. When the pipeline is being laid in deep water, a considerable length of pipeline will be suspended from the pipe-laying vessel. The force that the pipeline exerts on the vessel may become very large, especially when the diameter of the pipe is large and/or the pipe is heavy. The application of buoyancy means can decrease this force.

Preferably, the pipeline is laid in J-lay mode or S-lay mode. J-lay and S-lay modes of pipe-laying are generally performed by a single vessel. The invention is particularly suitable for pipelines which are laid by a single vessel, since a second vessel for installing the anchoring device is obviated.

In a preferred embodiment, during step (b) at least one pile is inserted into the seabed, and the anchoring device is connected to the seabed by means of the at least one pile. In this way, the anchoring device may be rigidly connected to the seabed. A pile which penetrates the seabed is a reliable and simple way of securely connecting the anchoring device to the seabed. A person skilled in the art will readily appreciate that a gravity anchor may also be applied for attaching the anchoring device to the seabed.

Preferably, the at least one pile is inserted into the seabed by means of a process, selected from a group, comprising: driving and suctioning. These known processes of inserting a pile into the seabed can be performed from the pipe-laying vessel and are therefore very suitable for this method.

Preferably, the pipeline is manufactured from a material selected from a group, comprising: steel, a synthetic material, and a composite steel/synthetic material. These materials are strong and have the necessary flexibility to be applied in a pipeline which is to be secured to an anchoring device.

Preferably, the guiding of the pipeline is monitored by monitoring means, preferably selected from the group, comprising: video recording means and acoustic monitoring means. With the monitoring means, the positioning of the pipeline can be monitored. When the pipeline is not in the correct position, corrections may be applied, by the pipe-laying vessel or by other means. The pipe-laying vessel may for instance increase or decrease the pulling force on the pipeline or move sideways, transversally to the main axis of the pipeline, for moving the pipeline horizontally, transversally to the main axis of the pipeline.

It is also possible that the pipeline misses the anchoring device in first instance, and touches the seabed adjacent the anchoring device. In that case, the pipe-laying vessel may increase the pulling force on the pipeline, thereby lifting it from the seabed. Then, a horizontal repositioning may be performed to position the pipeline above the anchoring device, in order to successfully lower it on the anchoring device in second instance.

The invention also relates to an anchoring device for anchoring a submerged pipeline, comprising a stop organ mounted thereto, wherein the anchoring device comprises:
   attachment means configured to attach the anchoring device to the seabed;
   a guiding device configured to guide the pipeline; and
   an engagement organ configured to engage with the stop organ of the pipeline.

This embodiment of the invention will advantageously hold a section of the pipeline in place when a tensile force is exerted upon the pipeline in an axial direction thereof.

Preferably, the anchoring device is adapted to support the pipeline against movement in a first direction from which first direction a pulling force is exerted on the pipeline, wherein the engagement organ comprises a contact surface which is configured to substantially face away from said first direction.

This contact surface provides a simple and effective way of transferring the tensile forces in the pipeline from the stop organ to the anchoring device.

In a preferred embodiment, the anchoring device comprises a base organ, a first projection and a second projection positioned at a predetermined distance from the first projection, the first and second projection projecting substantially upwardly from the base organ and defining a gutter therebetween. The gutter is configured to at least partially enclose the pipeline. The gutter provides the particular advantage of preventing the pipeline to move in a horizontal direction, transversal to the main axis of the pipeline.

Preferably, the gutter has a diameter which is slightly larger than the pipeline. It is important that the pipeline fits well into the anchoring device. With this diameter, a proper fit between the anchoring device and the pipeline can be ensured.

In a preferred embodiment, the guiding device is configured to guide the pipeline during the laying thereof towards the anchoring device.

The pipeline may be lowered upon the anchoring device in a downward movement, placing the stop organ of the pipeline directly in an engaging position with the engagement organ of the anchoring device. An easy installation of the pipeline is possible in this way.

However, when the pipeline is lowered on the anchoring device, it may be slightly out of the desired position. Variations in the horizontal position of the pipeline with respect to the desired trajectory thereof can be caused by current or measurement errors. Also the position of the anchoring device itself may be slightly different then expected. In these circumstances the guiding device will guide the pipeline to the proper position on the anchoring device, when the pipeline approaches the pipeline. The guiding device will be capable of guiding the pipeline towards the desired horizontal position wherein the stop organ will engage with the engagement organ of the anchoring device.

In a preferred embodiment, the guiding device comprises a first and a second guiding organ, wherein the first and the second guiding organ extend for a predetermined length upwardly from the anchoring device and outwardly away from one another. In this embodiment, the pipeline will be guided by the first and second guiding organ, using gravity as a driving force. When the horizontal position of the pipeline is slightly different then the desired trajectory it will contact the first or second guiding organ when it is lowered towards the anchoring device, and slide along the first or second guiding organ towards the engagement organ of the anchoring device. The stop organ may then be easily positioned in an engaging manner with the engagement organ of the anchoring device.

Preferably, the first and second guiding organs extend substantially transversally to the direction of the main axis of the pipeline. This provides the advantage of creating a wide 'catching zone' for the pipeline. When the pipeline is lowered within the catching zone, it will be guided towards the engagement organ.

Preferably, the first and second guiding organs have a rounded form. This provides a smoothly varying contact surface for the pipeline and reduces tensions in the pipeline as a result of the pressure on the pipeline exerted by the guiding means during the guiding of the pipeline.

In a preferred embodiment, the attachment means comprises at least one pile, which extends into the seabed for a predetermined distance. A pile is a proven way of securely connecting an anchoring device to the seabed.

Preferably, the pile is a driven pile, or a suction pile. These types of piles are known to provide a secure, cost-efficient, and simple connection between an anchoring device and the seabed. A person skilled in the art will readily appreciate that a gravity anchor may also be applied for attaching the anchoring device to the seabed.

It is possible to first lay the pipeline on the seabed with the stop organ positioned at a predetermined distance from the anchoring device. Next, the pipeline is moved substantially horizontally, for the stop organ to engage the anchoring device. Therefore, in a preferred embodiment, the anchoring device comprises a third guiding organ configured to guide the stop organ towards the engagement organ during a substantially horizontal movement of the stop organ towards the engagement organ. The stop organ may slide over the seabed towards the anchoring device. A proper engagement of the stop organ and the engagement organ of the anchoring device can thereby advantageously be ensured.

Preferably, the third guiding organ comprises a first and second guiding surface, tapering outwardly away from one another in a direction of the pipeline which, in use, is substantially free of tension forces. This configuration provides a simple means of guiding the stop organ towards the engagement organ. Preferably, the first and second guiding surface are positioned substantially vertically.

The invention also relates to a pipeline assembly which is anchored using the anchoring device described above. This pipeline assembly is very well suited for providing a connection between a well on the seabed and a production facility.

In a preferred embodiment of the pipeline assembly, the pipeline follows a curved trajectory over a predetermined distance in a direction away from the anchoring device on the side where the stop organ engages the anchoring device. The curved trajectory of the pipeline provides an extra length of pipeline which is needed when the pipeline is pulled by the pipe-laying vessel in order to move the stop organ towards the engagement organ of the anchoring device.

Preferably, the pipeline extends from the production facility to the seabed, the pipeline contacting the seabed at a touch-down point, from which touch-down point the pipeline extends over the seabed, and wherein the touch-down point is positioned at a predetermined distance from the anchoring device in the direction of the production facility.

This provides the advantage of ensuring a horizontal orientation of the pipeline near the anchoring device. A horizontal tensile force in the pipeline is thereby ensured as well, and also a horizontal force will be exerted by the pipeline on the anchoring device. In this way it is achieved that the pipeline will be held correctly by the anchoring device. A possible risk of the pipeline being lifted from the anchoring device upwardly is hence diminished.

The invention also relates to a production facility comprising at lease one pipeline as described above. Such a production facility has less risk of damaging a well when it is displaced by current, wind or waves and exerts large forces on the pipeline.

BRIEF DESCRIPTION OF THE DRAWINGS

FIG. 8a shows a top view of the anchoring device of the invention;

FIG. 8b shows a side view of the anchoring device of the invention;

FIG. 9a shows another top view of the anchoring device of the invention;

FIG. 9b shows a top view of a curved pipeline;

FIG. 9c shows a top view of an installed pipeline;

FIG. 10a shows another top view of the anchoring device;

FIG. 10b shows another side view of the anchoring device; and

Referring to FIGS. 1, 2, 3 and 4, a production facility 1 is shown, which is connected to a number of wells 2 by means of pipelines 3. The wells 2 may be spaced apart and the pipelines 3 may follow curved routes towards the wells 2. The wells 2 may be positioned in oil and gas fields in deep water. The production facility 1 is floating on the sea, whereas the wells 2 are located on the seabed 5. The pipeline 3 comprises a first section 6 which lays on the seabed 5 and a second section 7 which extends from the touch-down point 4 of the pipeline 3 towards the floating production facility 1. The second section 7 of the pipeline has substantially the shape of a catenary. This ensures that only tensile forces in the direction of the main axis of the pipeline will exist.

Figure 1:
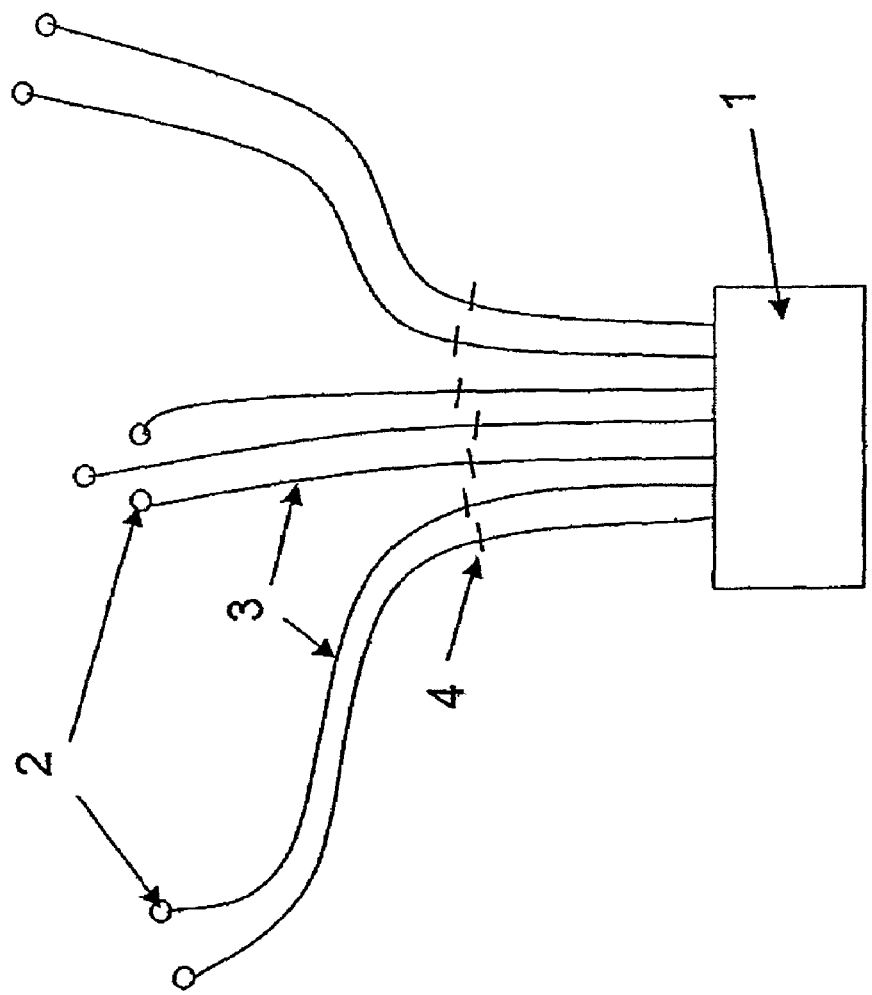
FIG. 1 shows a schematic top view of a production facility with pipelines.
Figure 2:
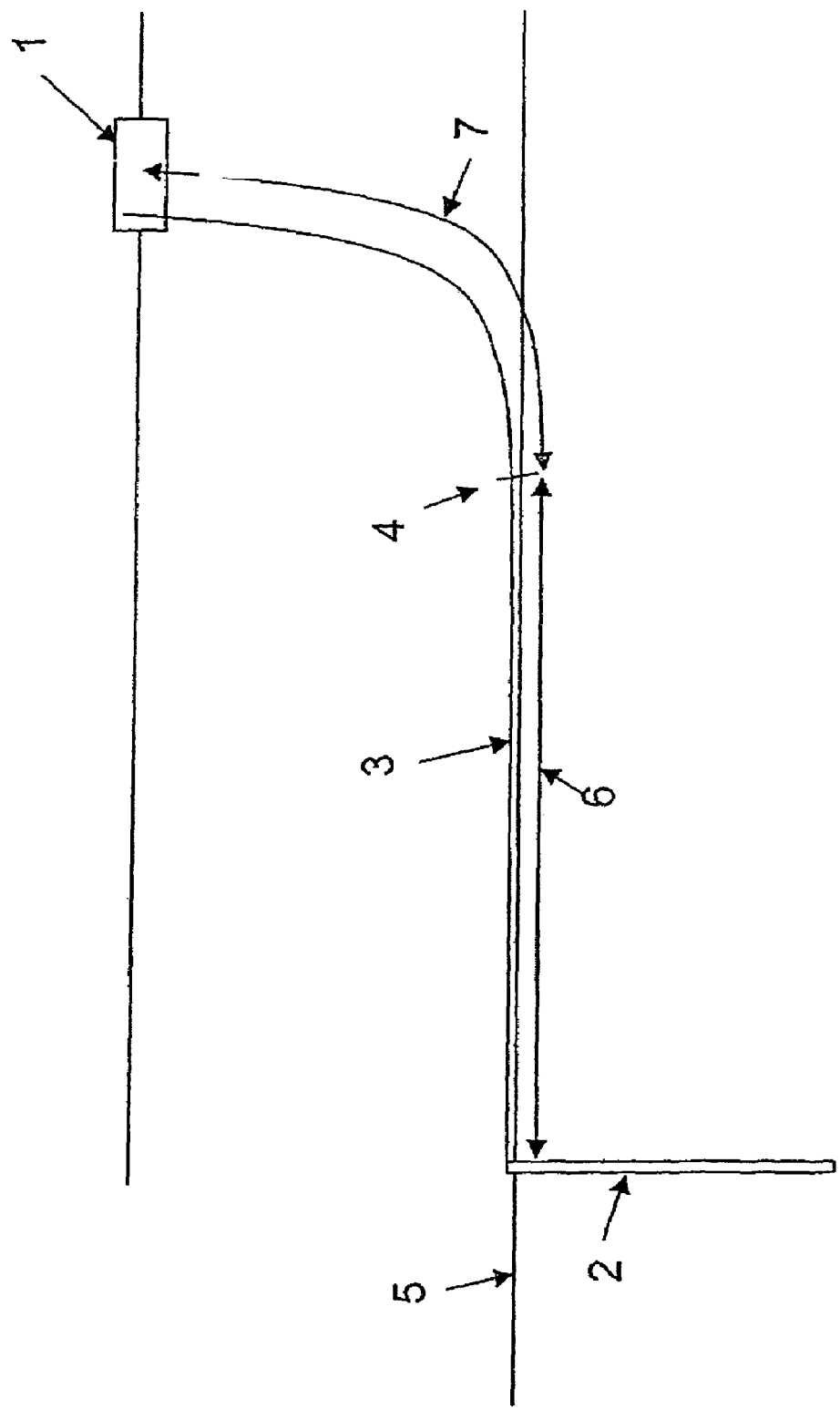
FIG. 2 shows a schematic side view of a pipeline between a well and a production facility.
Figure 3:
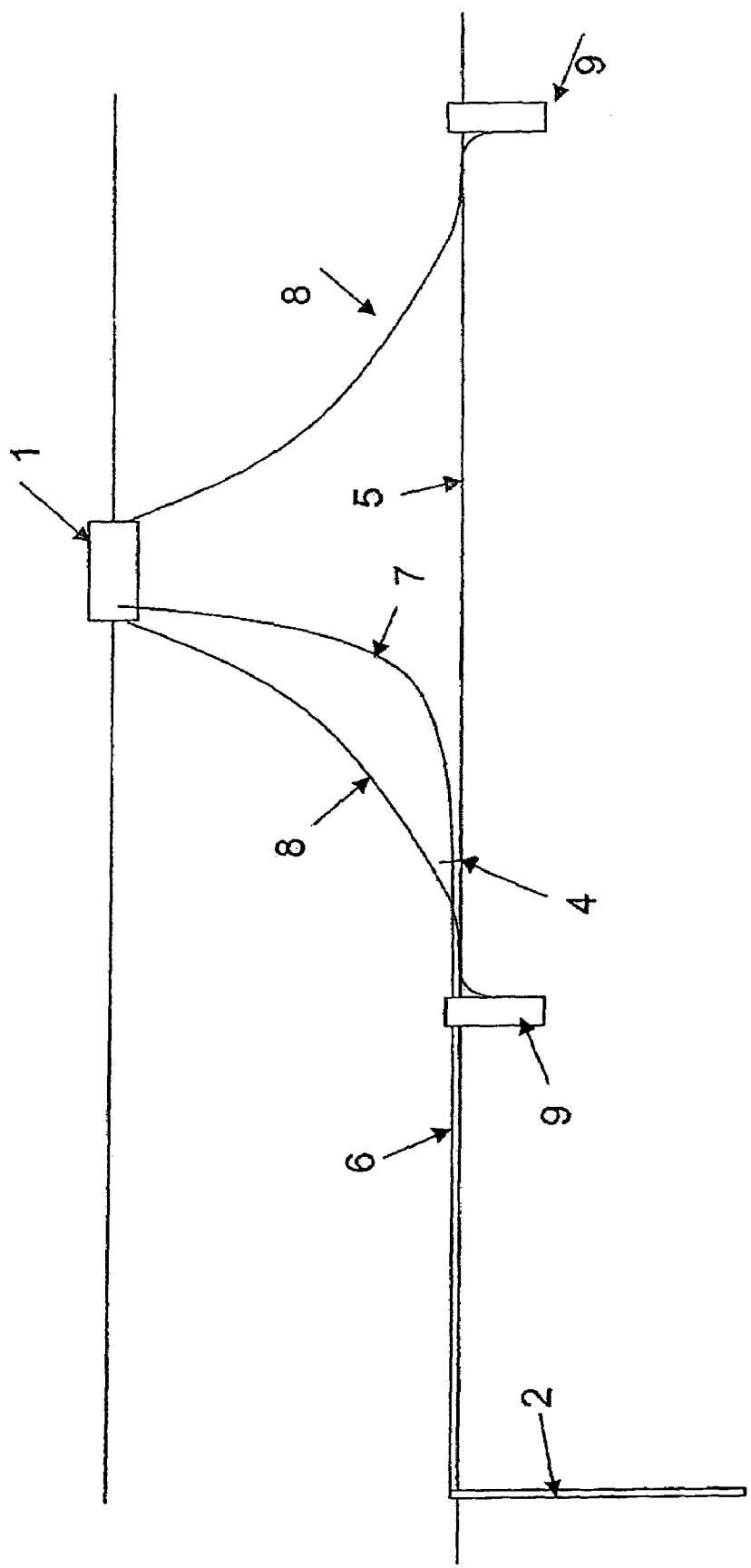
FIG. 3 shows a side view of a production facility with anchor lines.
Figure 4:
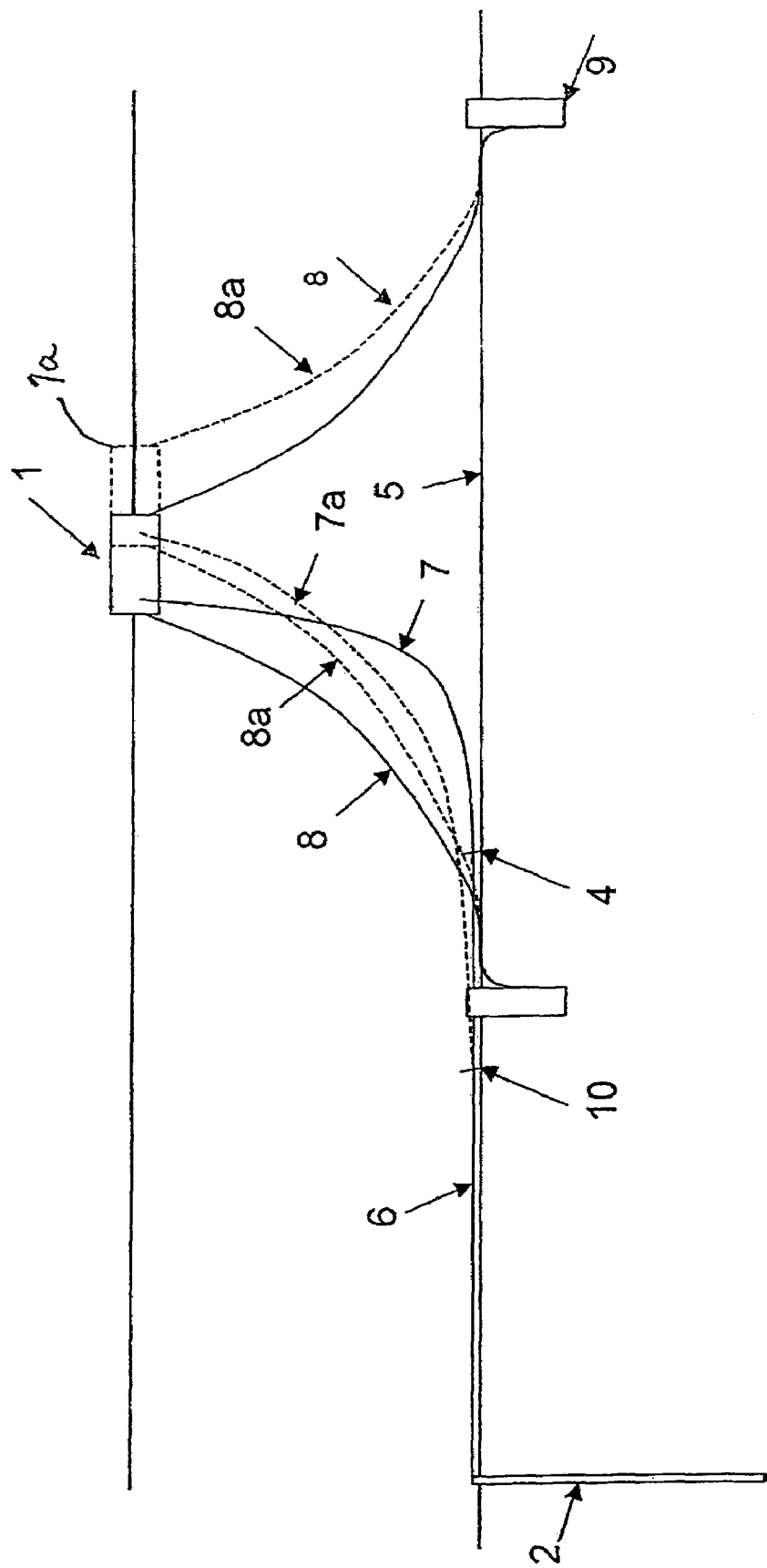
FIG. 4 shows a side view of a displaced production facility.

Normally, the floating facility 1 is anchored to the seabed 5 by means of anchor lines 8 which are connected to anchor piles 9 that extend into the seabed 5. The anchor lines 8 extend in a catenary shape from the floating facility 1 towards the anchor piles 9.

Due to environmental forces caused by current, wind and/or waves, the floating facility 1 will be displaced to a new position 1a. Consequently, the anchor lines 8 will adopt a new catenary shape 8a and the second section of pipeline 7 will adopt a new catenary shape 7a. As a result, the tensile forces in the direction of the main axis of the pipeline 1 will increase and the touch-down point 4 will move to a new position 10 which is located further away from the floating facility 1.

Figure 5:
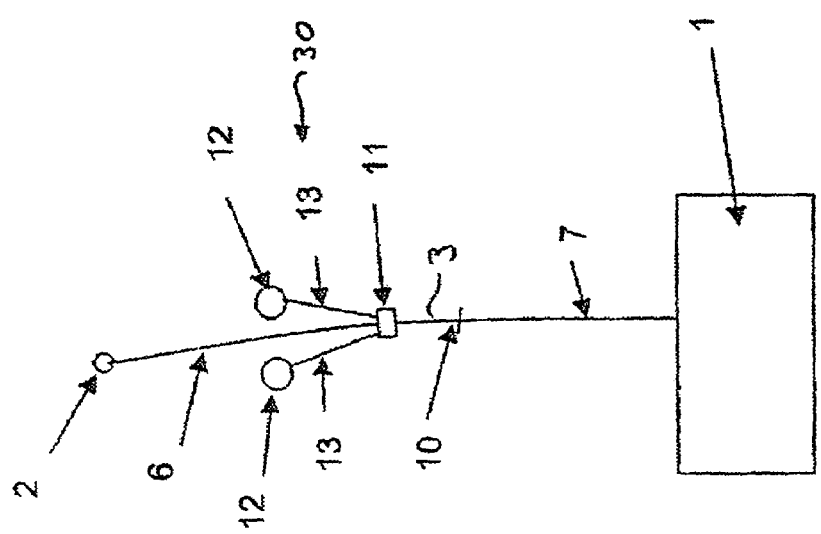
FIG. 5 shows a schematic top view of an anchored pipeline of the prior art.

Referring now to FIG. 5, when the distance between the touch-down point under tension 10 and the well 2 is short, the tensile forces in the pipeline 3 may tend to move the first pipeline section 6 in a direction away from the well 2, consequently exerting horizontal forces on the well 2. In that case, a pipeline anchoring device 30 is foreseen to prevent tensile forces to be transferred to the first section 6 of the pipeline. In the prior art, such a pipeline anchoring device 30 comprises; a coupling organ 11 on the pipeline 3, two anchor piles 12 which extend into the seabed 5 (e.g. driven piles or suction piles) or lay on the seabed (e.g. so-called dead man anchors); and connections means 13 connecting the pipeline 3 via the coupling organ 11 to the anchor piles 12. The anchor piles 12 are generally inserted into the seabed 5 before the pipeline 3 is laid at the anchoring location. The pipeline 3 is laid in between the pre-installed anchor piles 12, whereupon the connection means 13 are connected to the anchor piles 12 and the coupling organ 11. Often, the pipeline anchoring device 30 is already required to be present during installation of the pipeline 3.

Figure 6:
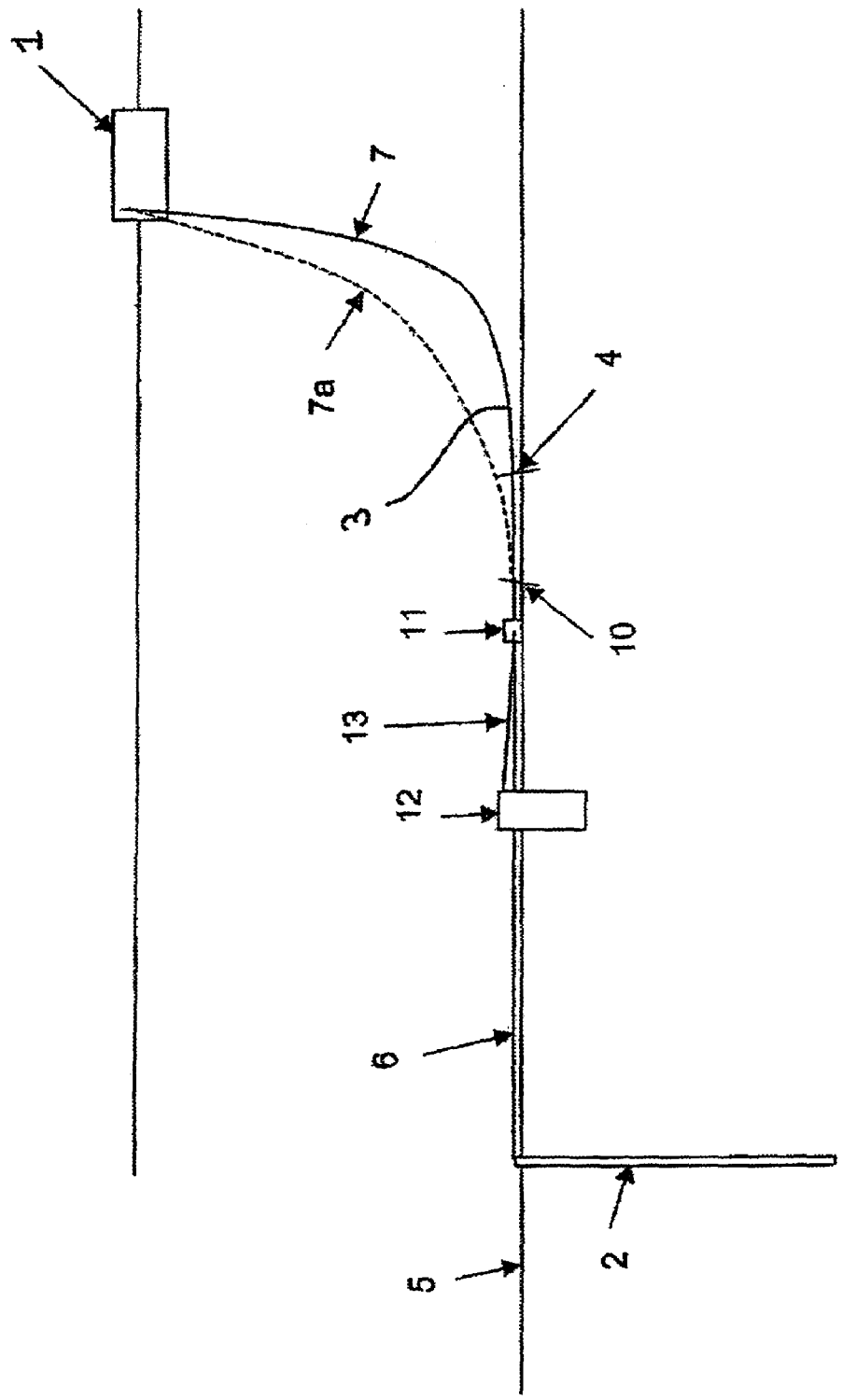
FIG. 6 shows a schematic side view of an anchored pipeline of the prior art.

Turning to FIG. 6, the holding device 11 is connected to the pipeline 3 in a position which is located between the touch-down position under tension 10 and the well 2, such that the first section of pipeline 6 is free of tensile forces between the well and the holding device 11.

Figure 7:
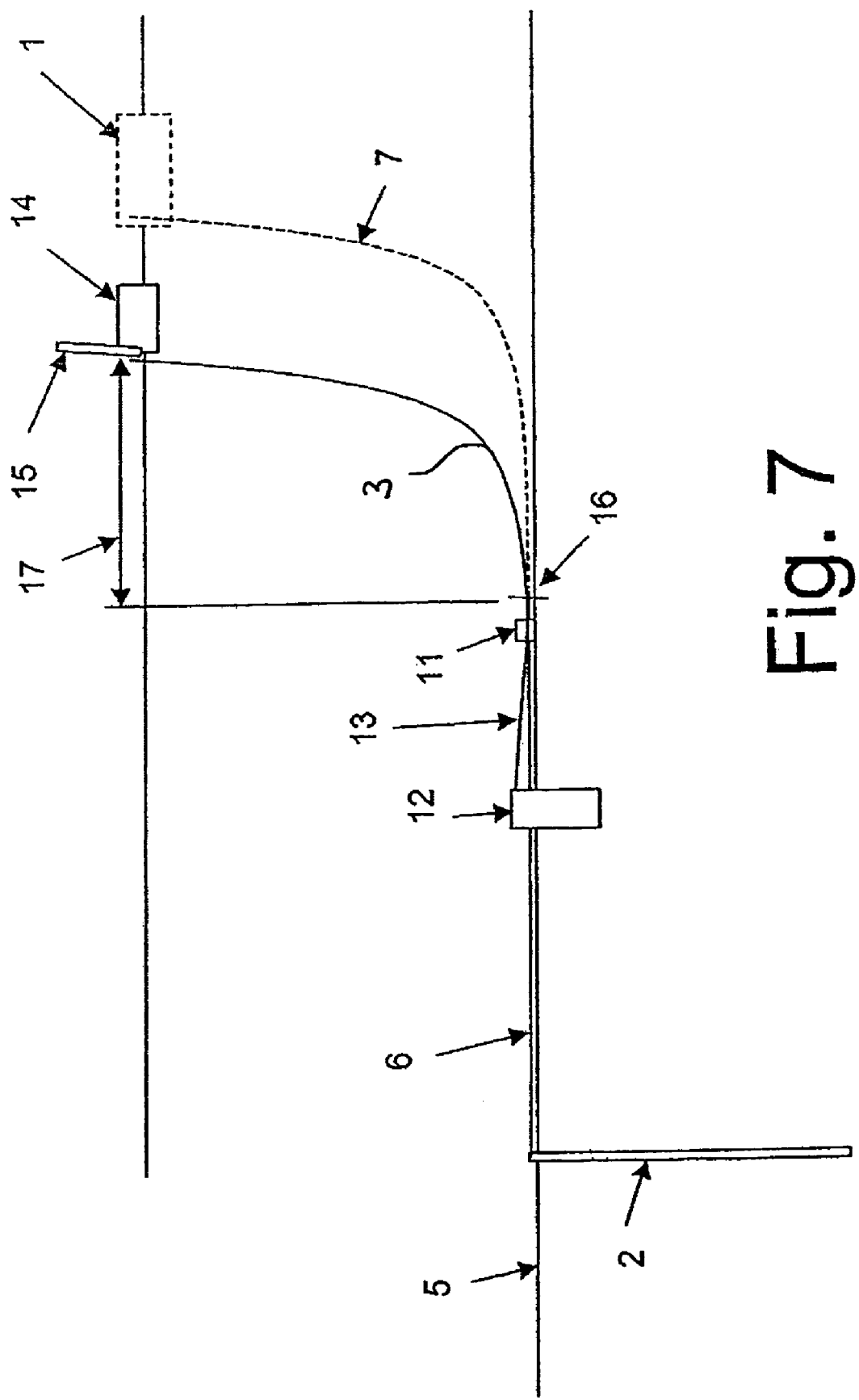
FIG. 7 shows a schematic side view of a pipe-laying operation.

Turning to FIG. 7, a J-Lay vessel 14 is shown in the process of laying a pipeline 3. Due to the shape of the pipeline 3, the J-Lay vessel 14 is at a distance 17 of approximately one-third of the water depth ahead of the touch-down point 16. This implies that the connection means 13 cannot be connected to the coupling organ 11 from the pipe laying vessel 14 and that a separate construction or service vessel (not shown) is required for connecting the connection means 13 to the anchor pile 12 and the holding device 11.

Referring now to FIGS. 8a and 8b, an anchoring device 100 according to the invention is shown, viewed from the top, together with a section 6 of pipeline 3, comprising a stop organ in the form of a collar 25 mounted to the pipeline 3. The stop organ may also have other forms. A single anchor pile 18 extends into the seabed 5 along the projected trajectory 19 of the pipeline 3. On the uppermost end of the pile 18, a base plate 20 is mounted, providing for a rigid connection between the anchoring device 100 and the seabed. On the base plate 20, a first projection 30a and a second projection 30b are mounted, forming a gutter 21. The gutter 21 has an opening which is slightly wider then the outside diameter of the pipeline 3. An engagement organ 23 is provided which has the same form as the collar 25 of the pipeline 3. The engagement organ 23 has a circular form. The engagement organ 23 has a contact surface 31 facing away from the pipe laying vessel, the contact surface being adapted to engaged with the collar 25. A guiding organ 22 is provided which tapers outwardly and is configured to guide the collar 25 towards the engagement organ 23. Also, guiding organs 24a and 24b are provided for guiding the pipeline 3 into the gutter 21 when the pipeline 3 is lowered towards the anchoring device 100. The guiding organs 24a and 24b have a rounded form, each guiding organ 24a and 24b comprising a substantially cylindrical body having a rounded upper end.

The anchoring device 100 comprises monitoring means 32a and 32b, for monitoring the process. The monitoring means 32a, 32b may be video recording means and acoustic monitoring means and preferably are equipped to send a signal to the pipe laying vessel 14. Additionally, monitoring means 33 may be provided on the pipeline 3. The monitoring means 33 are provided at the collar 25, but may also be provided at a section of the pipeline 3 which is first laid into the gutter. The monitoring means 32a, 32b and 33 are configured to measure the position and speed of the pipeline 3 and the collar 25 relative to the anchoring device 100. The monitoring means 32a, 32b and 33 are configured to send a signal to the pipe-laying vessel 14 by a known underwater signal transmitting device (not shown). On the basis of the signal, the pipeline laying process may be controlled.

It is also possible to provide a remotely operated vehicle (ROV) (not shown), equipped with sensing means. The ROV is positioned close to the anchoring means during the process, and monitors the process with one or more sensors, for instance with video recording means. Transmitting means are provided on the ROV for transmitting a signal to the pipe-laying vessel 14. The signal may relate to the position of the pipeline 3 relative to the anchoring device 100. The ROV is controlled from the pipe-laying vessel. ROV's are generally known in the art.

Referring to FIGS. 9a, 9b and 9c the projected trajectory 19 on the pipeline is shown, and the pipeline 3 is shown following a curved trajectory between boundaries 26. The curved trajectory has a substantially sinusoidal shape between these boundaries 26. In this way, some over-length is created between the well 2 and the anchoring device 100. The pipeline 3 approaches the anchoring device 100 during its downward movement. The pipeline 3 is laid over the head of the anchor pile 18. During the movement downwards, the guiding organs 24a and 24b guide the pipeline 3 into the gutter 21. On the pipe laying vessel 14, the collar 25 has been welded to the pipeline 3 at such a position, that it contacts the seabed 5 at a short distance 28 from the anchoring device 100. When the pipeline 3 has been lowered in a position in which it extends through the gutter 21, an extra pulling force 27 is exerted on the pipeline 3 from the pipe-laying vessel 14, in order to stretch the sinusoidal shaped pipeline 3 and move the collar 25 over a distance 28 towards the anchoring device 100 and into the tapered opening of the guiding organ 22, until the collar 25 engages with the contact surface 31 of the engagement organ 23.

Another advantage of the invention is the possible reduction of two anchor piles 12 to one anchor pile 18.

Referring to FIGS. 10a and 10b, once the collar 25 is fully engaged with the contact surface 31 of the engagement organ 23, the pipeline 3 is connected to the anchoring device 100 and able to bear forces exerted on the pipeline from the direction of the pipe-laying vessel 1. The entire operation can be carried out from the pipeline vessel 14 and is fully integrated with the pipe laying process.

Figure 11:
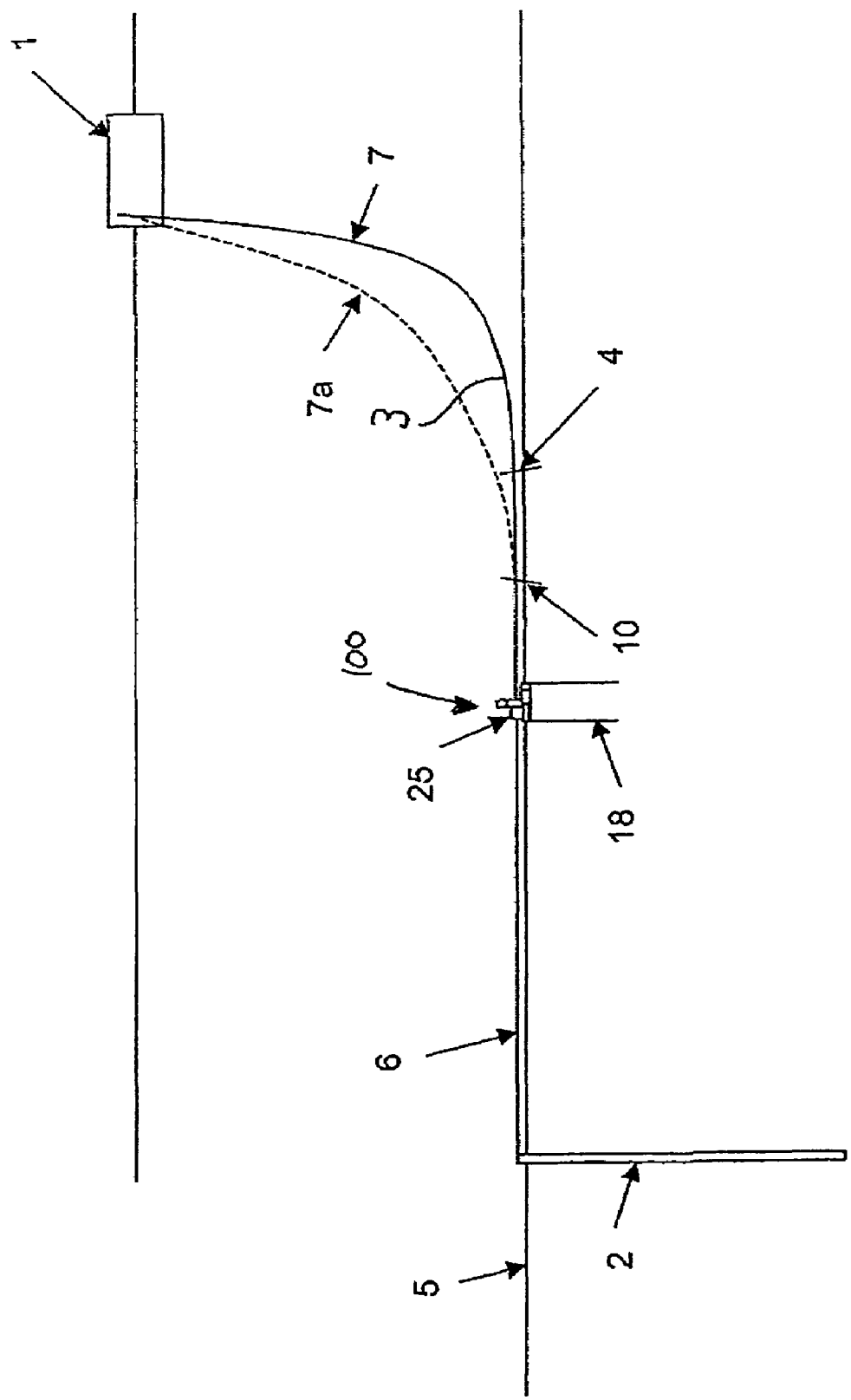
FIG. 11 shows a schematic side view of the installed pipeline.

Referring to FIG. 11, the final situation is shown, wherein the collar 25 of the pipeline 3 engages with the anchoring device 100, and wherein the touch-down point under tension 10 is always located at a substantial distance from the anchoring device 100, between the anchoring device 100 and the production facility 1. Tension forces exerted on the pipeline 3 are not transferred beyond the anchoring device 100 into the section 6 of the pipeline 3 between the well 2 and the anchoring device 100, but diverted into the seabed 5 by the anchoring device 100.

The second section 7 of the pipeline 3 may be equipped with buoyancy means (not shown) which are generally known in the art, for providing buoyancy to the pipeline, thereby reducing tensile forces in the pipeline.

It will be obvious to a person skilled in the art that numerous changes in the details and the arrangement of the parts may be varied over considerable range without departing from the spirit of the invention and the scope of the claims.

The invention claimed is:

1. A method for anchoring a submerged pipeline in particular to a seabed, comprising the steps of:
   a. providing the pipeline with a stop organ connected thereto at a position along the pipeline between the free ends thereof;
   b. connecting an anchoring device to the seabed;
   c. laying the pipeline on the seabed from a floating vessel; and
   d. guiding the pipeline into a position wherein the stop organ engages the anchoring device, such that the anchoring device prevents the pipeline from moving in at least one longitudinal direction thereof, the pipeline extending in substantially the same direction on either side of the anchoring device.

2. The method of claim 1, wherein the stop organ comprises a collar.

3. The method according to claim 1, wherein step (c) further comprises positioning the stop organ on the seabed at a predetermined distance from the anchoring device, and wherein step (d) comprises moving the pipeline in order to engage the stop organ with the anchoring device.

4. The method according to claim 1, wherein in step (d) the pipeline is guided at least partly by the anchoring device.

5. The method according to claim 1, wherein in step (d) the pipeline is moved substantially horizontally in order to engage the stop organ with the anchoring device.

6. The method according to claim 1, wherein the pipeline is connected with a first end thereof to the vessel, and with a second end thereof to a well.

7. The method according to claim 1, wherein the pipeline is laid in a curved trajectory over a predetermined distance, on a side of the anchoring device where the stop organ is to engage the anchoring device.

8. The method according to claim 7, wherein the curved trajectory is substantially sinusoidal.

9. The method according to claim 1, further comprising a step (e), wherein the first end of the pipeline is connected to a floating production facility.

10. The method according to claim 1, wherein the buoyancy of the pipeline is increased by buoyancy means.

11. The method according to claim 1, wherein the pipeline is laid in J-lay mode or S-lay mode.

12. The method according to claim 1, wherein in step (b) at least one pile is inserted into the seabed, and wherein the anchoring device is connected to the seabed by means of the at least one pile.

13. The method according to claim 12, wherein the at least one pile is inserted into the seabed by driving or suctioning.

14. An anchoring device for anchoring a submerged pipeline comprising a stop organ connected thereto, wherein the anchoring device comprises:
   connecting means configured to attach the anchoring device to the seabed;
   a guiding device configured to guide the pipeline; and
   an engagement organ configured to engage with the stop organ of the pipeline, the anchoring device being configured to accommodate a pipeline which rests at least in part on a seabed and has a stop organ at a position along the pipeline between the free ends thereof, the anchoring device being configured to prevent the pipeline from moving in at least one longitudinal direction thereof, the anchoring device being configured to accommodate a pipeline which extends in substantially the same direction on either side of the anchoring device.

15. The anchoring device according to claim 14, wherein the anchoring device is adapted to support the pipeline against movement in a first direction from which a pulling force is exerted on the pipeline, wherein the engagement organ comprises a contact surface which is configured to substantially face away from said first direction.

16. The anchoring device according to claim 14, comprising a base organ of the connection element, a first projection and a second projection positioned at a predetermined distance from the first projection, the first and second projection projecting substantially upwardly from the base organ, and defining a gutter therebetween.

17. The anchoring device according to claim 16, wherein the gutter has a diameter which is larger than the pipeline, such that the pipeline can move into the gutter and fit in the gutter.

18. The anchoring device according to claim 14, wherein the guiding device is configured to guide the pipeline during a substantially downward movement thereof towards the anchoring device.

19. The anchoring device according to claim 18, wherein the first and second guiding organs have rounded sides.

20. The anchoring device according to claim 14, wherein the guiding device comprises a first and a second guiding organ, wherein the first and second guiding organs extend for a predetermined distance upwardly from the anchoring device and outwardly away from one another.

21. The anchoring device according to claim 20, wherein the first and second guiding organ extend substantially transversally to a central axis of the gutter.

22. The anchoring device according to claim 14, wherein the connecting element comprises at least one pile configured for extending into the seabed for a predetermined distance.

23. The anchoring device according to claim 22, wherein the pile is a driven pile or a suction pile.

24. The anchoring device according to claim 14, wherein the anchoring device comprises a third guiding organ configured to guide the stop organ during a substantially horizontal movement towards the engagement organ.

25. The anchoring device according to claim 24, wherein the third guiding organ comprises a first and a second guiding surface, tapering outwardly away from one another in a direction of the pipeline which, in use, is substantially free of tension forces.

26. Pipeline assembly according to claim 25, wherein the pipeline follows a curved trajectory over a predetermined distance on the side of the anchoring device where the stop organ engages the anchoring device, such that an extra length of pipeline is available when the pipeline is pulled by the pipe-laying vessel in order to move the stop organ towards the anchoring device and let the stop organ engage with the anchoring device.

27. A pipeline assembly anchored using the anchoring device of claim 14, extending in substantially the same direction on either side of the anchoring device.

28. Pipeline assembly according to claim 27, wherein the pipeline extends from a production facility to the seabed, the pipeline contacting the seabed at a touch-down point, from which touch-down point the pipeline extends over the seabed, and wherein the touch-down point is positioned at a predetermined distance from the anchoring device in the direction of the production facility.

29. A production facility comprising at least one pipeline according to claim 27.

30. The pipeline assembly according to claim 27, wherein the stop organ comprises a collar.

31. The pipeline assembly according to claim 27, wherein the first and second guiding organ extend substantially transversally to the main longitudinal axis of the pipeline.

32. The pipeline assembly according to claim 27, wherein the engagement organ has a circular portion corresponding to the annular collar.

\* \* \* \* \*